United States Patent [19]

Renton

[11] Patent Number: 5,059,316
[45] Date of Patent: Oct. 22, 1991

[54] WATER TREATMENT DEVICE

[76] Inventor: Michael B. Renton, 31 4th Avenue, Parktown North, Johannesburg 2193, South Africa

[21] Appl. No.: 356,894

[22] Filed: May 25, 1989

[30] Foreign Application Priority Data

May 25, 1988 [ZA] South Africa ............... 88/3752

[51] Int. Cl.[5] ............................................. C02F 1/50
[52] U.S. Cl. ........................... 210/198.1; 210/169; 210/242.1; 422/265; 422/277; 422/278
[58] Field of Search ............... 210/169, 192, 198.1, 210/242.1; 422/265, 263, 274, 277, 278

[56] References Cited

U.S. PATENT DOCUMENTS

| 2,934,409 | 4/1960 | Biehl | 422/265 |
|---|---|---|---|
| 3,423,182 | 1/1969 | Klasky | 210/169 |
| 3,595,395 | 7/1971 | Lorenzen | 210/169 |
| 3,607,103 | 9/1971 | Kiefer | 210/242.1 |
| 4,606,893 | 8/1986 | Sangster | 422/265 |
| 4,643,881 | 2/1987 | Alexander et al. | 422/265 |
| 4,702,270 | 10/1987 | King, Sr. | 422/265 |
| 4,763,685 | 8/1988 | King, Sr. | 422/265 |

FOREIGN PATENT DOCUMENTS 701366 2/1971 South Africa.

Primary Examiner—Ivars Cintins
Attorney, Agent, or Firm—Browdy and Neimark

[57] ABSTRACT

A water treatment device used in treating water in for example a swimming pool is disclosed. It comprises a blow moulded container which contains water treatment material comprising chlorine pills or portions of such pills and bouyancy means giving a bouyancy to the device such that when the container contains a predetermined amount of water treatment material, the container will sink to the bottom of the pool while the container will float on the surface of the water when it does not contain any pill material or only a small amount of such pill material. The container further comprises a skirt or similar support means located at the periphery of the container to support the container off the floor of the water containment. At the centre portion of the container base there may be a projection, which is part spherical in shape so that the WT device may rock slightly on movement of water therearound, the support means limiting the amount of such rocking movement.

21 Claims, 3 Drawing Sheets

WATER TREATMENT DEVICE

This invention relates to water treatment devices.

The invention is concerned with a water treatment device of the kind used in treating water in for example a swimming pool or other body of water, the device being adapted to contain water treatment material (i.e. material that slowly release gasses such as chlorine into the water and that has a specific gravity greater than that of water)(which water treatment material is hereinafter referred to as "WTM"), the device comprising (a) a container arranged to retain the WTM therein but to permit water access thereto and (b) buoyancy means. Such a water treatment device is hereinafter called a "WT device".

According to one aspect of the invention there is provided a WT device comprising buoyancy means giving a buoyancy to the WT device such that when the container contains a predetermined amount of WTM, the container will sink to the bottom of the water while the container will float on the surface of the water when it does not contain any WTM or only a small amount of such WTM and support means located at the periphery of the container to support the container off the floor of the water containment (which may be a swimming pool or resevoir). At the centre portion of the container base there may be a projection, which is preferably part spherical in shape so that the WT device may rock slightly on movement of water therearound, the support means limiting the amount of such rocking movement.

The WT device may in a preferred embodiment comprise a blow moulded body having a lower portion to receive WTM and, an upper portion having an outlet opening through which gasses or treated water can escape.

The buoyancy means may conveniently comprise a chamber into which gasses may be received. The buoyancy means may further or alternatively comprise a buoyancy member.

The support means may comprise a plurality of narrow feet or it may comprise a skirt having apertures therein through which water may pass.

Embodiments of the invention will now be described by way of example with reference to the accompanying drawings in which the sizes of various parts are exaggerated for the purposes of clarity.

SHORT DESCRIPTION OF DRAWINGS

DESCRIPTION OF A FIRST EMBODIMENT

Figure 1:
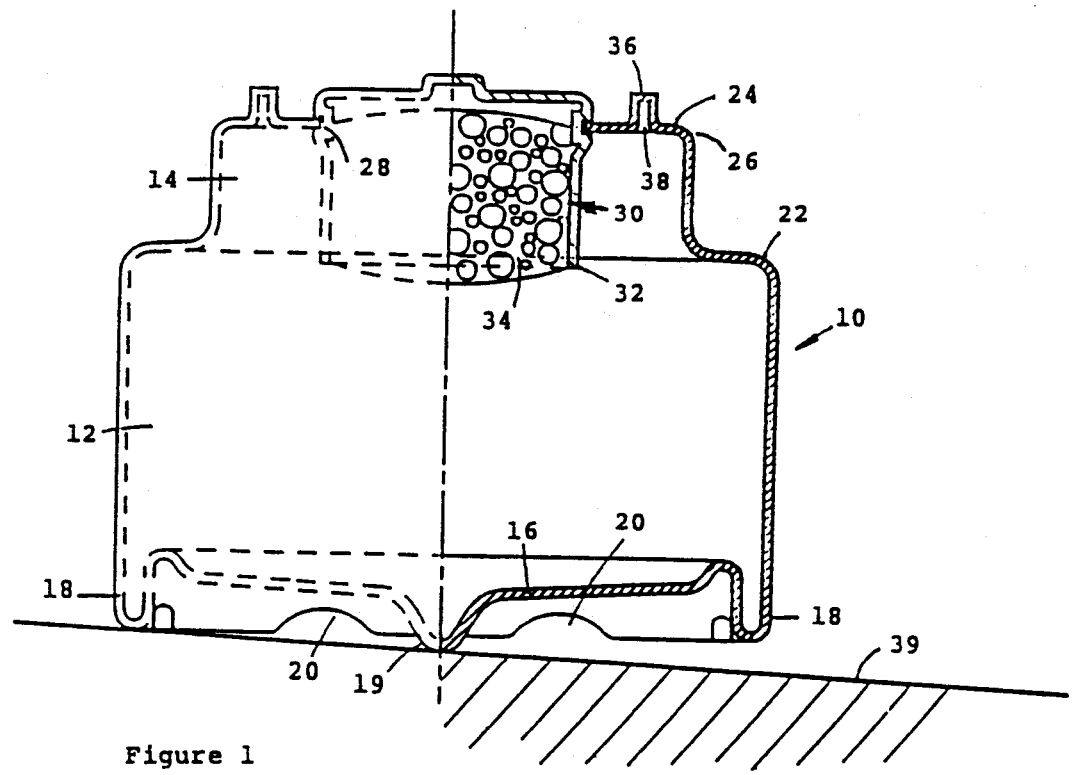
FIG. 1 is a side view partially broken away of a WT device of the invention.
Figure 2:
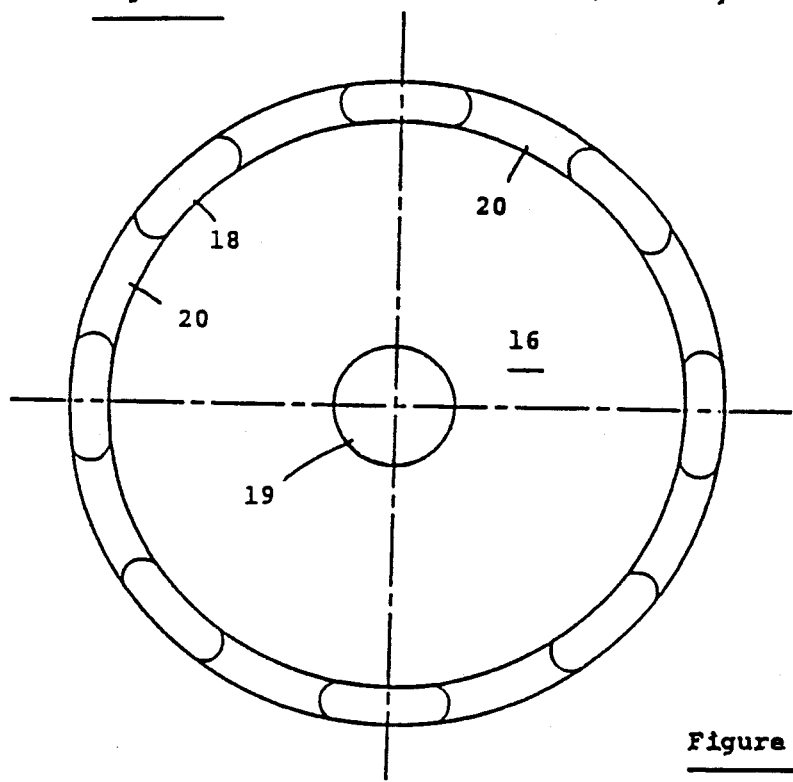
FIG. 2 is an underplan of the WT device.

Referring now to FIGS. 1 to 2, there is shown diagramatically a WT device 10 of the invention for use in the treatment of water in a swimming pool. The device comprises a blow moulded plastics container of circular cross-section and relatively stubby shape and having a lower chamber 12 and an upper chamber 14.

The lower chamber 12 is of enlarged diameter and has an imperforate base part 16 at the periphery of which is formed with a dependant skirt 18 in which enlarged openings 20 are formed. The centre of the base part 16 has a depending pivot member 19 having a part spherical end which extends further down than the skirt 18. Thus when the device 10 is in the pool, it can rock slightly on the dome 19 due to the movement of water therearound to agitate the contents of the chamber 12. The skirt 18 will however limit such rocking movement to prevent the device 10 from falling on its side.

The upper chamber 14 is of smaller diameter than the chamber 12 and is joined thereto by a flange member 22. The upper end of the chamber 14 has an inwardly directed flange 24 with rounded corners 26 and a central opening 28 which is closed and sealed off by a hollow plug 30. The plug 30 has a skirt 32 extending below the flange 24. The plug 30 contains a buoyancy member 34 constituted by a closed cell foamed plastic material such as polyvinylchloride or polyurethane material.

Formed on the outer corner 26 of the flange 24 is a pair of nodules 32 that can be cut off to form openings 34 of small cross-section (say about two millimeters in diameter).

In use, the lower chamber 12 contains WTM in the form of whole (or broken parts of) conventional stabilised chlorine pills which have a density greater than that of water. The amount of chlorine pills contained has a mass equivalent to, say, four such pills. A user will now cut off both of the nodules 32. The device 10 is now thrown into a swimming pool. Because of the mass of the contents of the lower chamber 12, this will soon be lowermost and the skirt 18 will come to rest upon the floor (shown diagrammatically at 36) of the swimming pool. The water in the pool will now pass through the openings 34 left by removing the nodules 32 to come into engagement with the pill material. The water will react with the WTM which will give off amounts of chlorine that will move to the upper portion of the upper chamber. The gasses will form a bubble of such gasses forcing water out of the the openings 34. When the level of the bubble is below the openings 34, gas will escape from the container to treat the pool water. It will be also seen that the part of the gas bubble within the plug 30 will extend to the end of the skirt 32 to provide buoyancy means for the device.

After the container has been in the pool a certain amount of time, most of the pill material will have been converted into gas. The buoyancy of the gas in the plug 30 and the effect of the buoyancy device will be such that it overcomes the mass of the remaining pill material. The device 10 will now float to the surface of the swimming pool and the user can see that the device has served its use and can now be discarded and replaced.

If the pool is used by swimmers so that additional chlorination is required, the rocking of the device on the pool floor will agitate the pill material and water in the container increasing the amount of gasses given off and abrading away pill residue. This residue will fall to the bottom of the container and bring fresh surfaces of the pill material into contact with the water in the container.

It will be seen that due to the shape of the container 10 and in particular the support means constituted by the skirt 18, the mass of the WT material in the lower chamber and the bouynncy means, the container will always be in an upright position. Thus the gas opening 34 will always be away from the pool floor. Furthermore as the skirt 18 permits water flow below the base plate, staining of the pool floor will be obviated or at the very least substantially minimised.

DESCRIPTION OF A MODIFICATION

Figure 3:
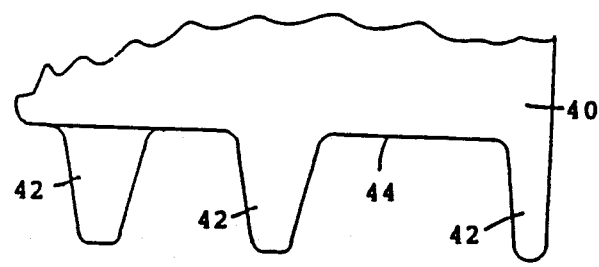
FIG. 3 is a detail side view partially broken away of a modified WTM device of the invention.

Referring now to FIG. 3, there is shown the lower end of a modified chamber 40 of the invention. This is identical to the chamber 10 save that instead of having a dependant skirt, the chamber is formed with support means constituted by three legs 42 on its underside at the periphery of the base part 44.

DESCRIPTION OF ANOTHER EMBODIMENT

The device 10 can be modified for use with unstabilised pill material. A grid is formed slightly above the base of the lower chamber into which sludge formed on the surface of the pill material may fall when the chamber rocks as aforesaid so that fresh pill material will be presented to the water to react therewith. Such a grid is shown in and described with reference to the embodiment of FIG. 6.

DESCRIPTION OF A FURTHER EMBODIMENT

Figure 4:
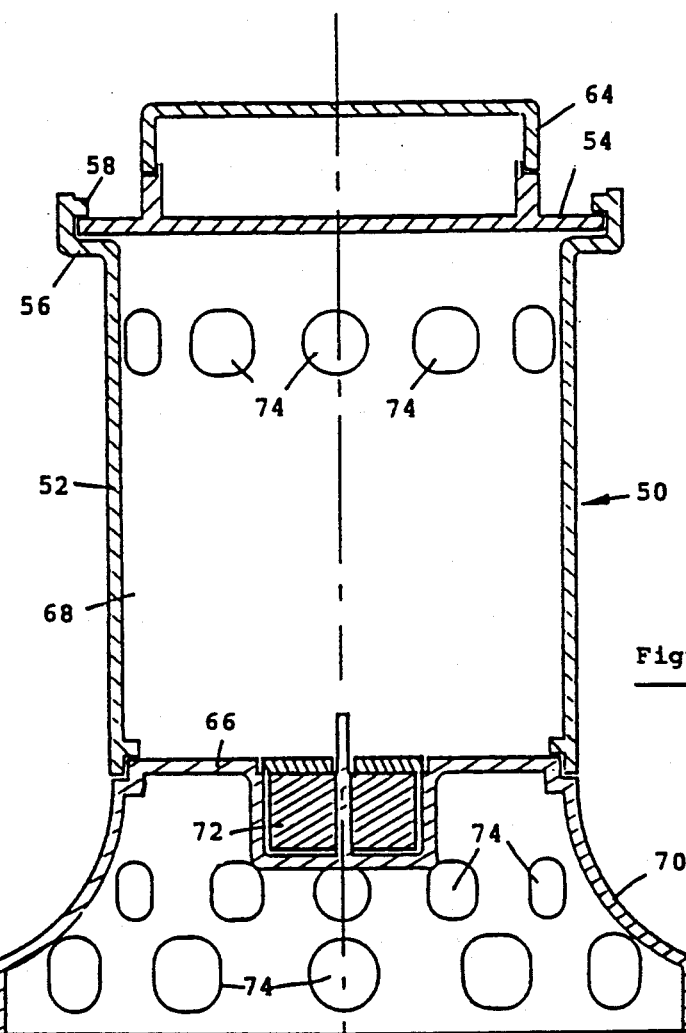
FIG. 4 is a view similar to FIG. 1 of another WT device of the invention.
Figure 5:
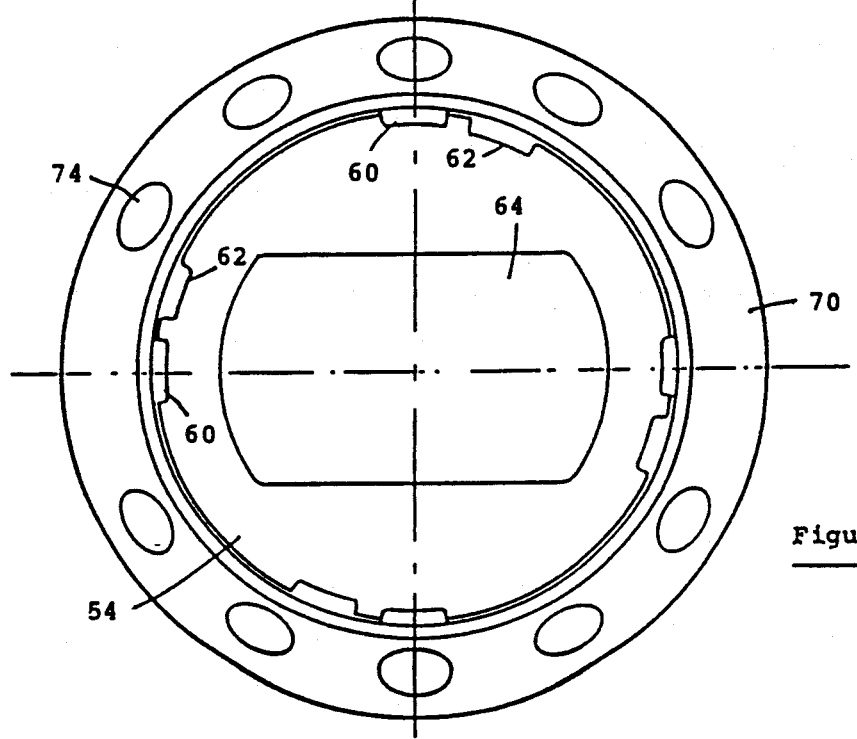
FIG. 5 is a plan of the WT device of FIG. 4.

Referring now to FIGS. 4 and 5 there is shown a WT device 50 of the invention comprising a lower cylindrical basket 52 and a closure device 54 at its upper end. Both these parts are plastics mouldings.

The basket 52 has an outward flange 56 at its upper end above which is an inwardly directed parallel cover flange 58 at its upper end. There are a set of radial nibs 60 formed on the upper flanges 58. The closure device 54 has a set of openings 62 which can receive the nibs 60 so that on insertion of the nibs 60 into the openings 62 and on rotation of the device 54, the closure device 54 is releasably secured to the basket 52.

A sealed hollow handle 64 is secured to the device 54 to act both as a twist-off handle and as a buoyancy means.

The basket 52 has a transverse floor 66 spaced from its lower end which divides the sides of the basket 52 into a body 68 above the floor 66 and a skirt 70 below. The skirt 70 is outwardly belled so that its lower edge is larger than the floor 66. A lead weight 72 is placed below the floor 66 to ensure that the basket 50 remains upright. There are a number of openings 74 through the body 68 and the skirt 70 to permit relatively free flow of water therethrough. The floor 66 is unperforated so that water cannot pass through it.

The basket 52 is of such size that it can receive therein five chlorine pills (not shown) stacked one above the other. These can be inserted into the basket by removing the closure device 54 and thereafter replacing it.

DESCRIPTION OF ANOTHER EMBODIMENT

Figure 6:
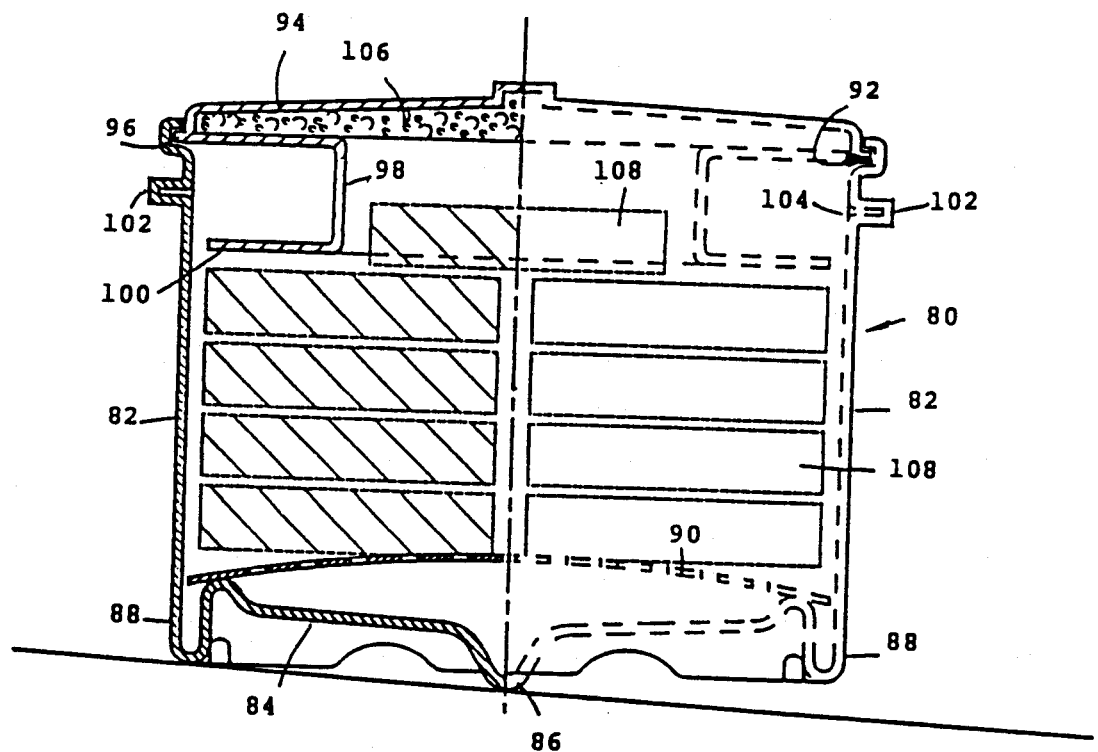
FIG. 6 is a view similar to FIG. 1 of a modified device of the invention.

In FIG. 6 there is shown a further WT device 80 of the invention. The WT device comprises a main substantially cylindrical container 82. The container 82 is formed with the base plate 84 having a central projection 86 the lower end of which is part spherical and which is surrounded by a skirt 88 (similar to the skirt 18 of the first described embodiment) at the periphery of the base plate 84 which projects downwardly slightly less than projection 86. A slightly conical residue screen 90 rests on the base plate 84. At its upper end the container 82 has a peripheral recess 92. The container 82 is closed by a plug 94 having a slightly domed upper surface with a small peripheral flange 96 that fits into the recess 92. The plug 94 has an inward surface 96 leading to a deep neck 98 of about one half of the diameter of the flange 96. This neck 98 terminates in a radial flange 100 which extends to very close to the side wall of the chamber 82. The space in between the ends of the flange 100 and the side wall 82 is such as to form a choke on air and water flow from below the flange to above.

Formed on the walls of the container 82 at about the upper level of the neck 98 are a pair of diametrically oppositely located nodules 102. These nodules can be cut to leave openings 104 of approximately two millimeters in diameter.

A wad 106 of closed cell plastics buoyancy material of the kind which forms the member 36 described above is provided in the upper portion of the plug 94 above the surface 96.

The container body 82 and the plug 94 can be blow moulded from a single unit and parted along the line at the join of the flange and the upper end of the container to provide the portions as shown. Within the container is located a number of unstabilised chlorine pills 108 which rest on the residue screen 90.

In use, the nodules 102 are cut off and the container is held in the water, conveniently in the wier so that water can enter into the container. The water will fill the container up to a waterline 110 at the level of the flanges 100. The container 82 will now be thrown into the water where it will rest on the floor of the swimming pool with the projection and skirt resting thereon as described above. It will be seen that most of the pills 108 will be engaged with the water and these will react therewith to give off gases which will pass up between the end of the flange and the side of the container. The gases will escape through the openings 104 to chlorinate the pool water.

After a pill 108 has degraded sufficiently so that material falls off it through the screen 90 the remaining pills will drop down so that they will thereafter come into contact with the water and react therewith to give off gasses.

When all the pills 108 have been degraded, the buoyancy caused by the bubble of air formed within the plug 94 will lift the container to the surface of the pool. The user of the pool will then realise that the pills have been used up and the device must be replaced.

GENERAL

It will be noted that with all the devices described above, excepting for the device of FIGS. 4 and 5, it is necessary before discarding the device, to drain the water from the device conveniently into the weir and before throwing it away. This can most conveniently be be accomplished by cutting off the central depending projection on the container.

ADVANTAGES OF THE ABOVEDESCRIBED EMBODIMENTS

Because the chlorine laden water that flows out of the basket is not exposed to bright sunlight (as would be the case if the WT device was floating close to the surface of the pool) the effectiveness of the chlorine pill/s is enhanced. As a result of the fact that the containers are on the pool floor and not floating on the surface, which would have the effect of drawing the chlorinated surface water into the pool weir, there is a better distribution of treated water through the pool water. Because the waterflow is less at the bottom of the pool and because the gas released from the device has greater opportunity to treat the pool water from the bottom of the pool, the effective life of the WTM is prolonged without reducing the degree of water treatment. Furthermore, because the container rises to the surface of the swimming pool when the pills have become exhausted, there is a simple but effective warning to the pool owner that he must replace the water treatment device or the WTM in the device.

As the container 10 is formed as a sealed blow moulding, this provides the user with a supply of chlorine which requires no direct contact in handling and when the chlorine is used up, the container with its contents becomes a throw-away item.

As the walls of the container are cylindrical without any protrusions thereon, it is possible to print direct on to these walls by the silk screen process.

MODIFICATIONS TO THE EMBODIMENTS

The invention is not limited to the precise constructional details hereinbefore described and illustrated in the drawings. For example the parts may be of different sizes. The manner in which the closure is secured to the basket may be changed. The number of nodules may be more than two. Other buoyancy means may be provided. The buoyancy may be changed to provide earlier warning of pill depletion. Instead of chlorine pill material, the WTM may comprise any other suitable solid water treatment material. Among other such material may be chlorine granules, dry acid granules and the like.

The foamed plastic buoyancy member may be ommitted and reliance placed soley on the gas bubble for the requisite buoyancy.

I claim:

1. A water treatment device for treating water in a water containment comprising
   a. a container having a top portion, sides and a base,
   b. buoyancy means within the container giving a buoyancy to the water treatment device such that when the container contains a predetermined amount of water treatment material, the container will sink to the bottom of the water containment while the container will float on the surface of the water when it does not contain any water treatment material or only a small amount of such water treatment material,
   c. support means located at the periphery of the container to support the container off the bottom of the water containment, said support means having openings therethrough to permit the flow of water between the container and the bottom of water containment,
   d. a projection on the center portion of the base extending below the level of the support means so that the water treatment device may rock slightly on movement of water therearound, the support means limiting the amount of such rocking movement.

2. A device as claimed in claim 1 wherein the said center portion is part spherical in shape.

3. A device as claimed in claim 1 in which said container and said support means are formed as a moulding so that said support means are hollow.

4. A water treatment device for treating water in a water containment comprising
   a. a container having a top portion, sides and a base,
   b. buoyancy means within the container giving a buoyancy to the water treatment device such that when the container contains a predetermined amount of water treatment material, the container will sink to the bottom of the water containment while the container will float to the surface of the water when it does not contain any water treatment material or only a small amount of such water treatment material, said buoyancy means comprising a sealed portion of the device wherein a gas bubble can be formed and received,
   c. support means located at the periphery of the container to support the container off the bottom of the water containment, said support means having openings therethrough to permit flow of water between the container and the bottom of the water containment, and
   d. a projection on the center portion of the base extending below the level of the support means so that the water treatment device may rock slightly on movement of water therearound, the support means limiting the amount of such rocking movement.

5. A device as claimed in claim 4 wherein the said sealed portion comprises a plug which closes an opening in the device.

6. A water treatment device for treating water in a water containment comprising
   a. a container,
   b. buoyancy means within the container giving a buoyancy to the water treatment device such that when the container contains a predetermined amount of water treatment material, the container will sink to the bottom of the water containment while the container will float on the surface of the water when it does not contain any water treatment material or only a small amount of such water treatment material,
   c. support means located at the periphery of the container to support the container off the bottom of the water containment, said support means having openings therethrough to permit the flow of water between the container and the bottom of the water containment, and
   d. hollow nodules formed in the wall of the container below its end remote from said support means, the nodules being capable of being cut off to leave small openings through at least one of which openings gasses may escape from the container.

7. A water treatment device for treating water in a water containment comprising
   a. a container having a top portion, sides and a base,
   b. support means located at the periphery of the container to support the container off the bottom of the water containment, said support means having openings therethrough to permit flow of water between the container and the bottom of the water containment,
   c. buoyancy means within the container located at a part of the container remote from the support means, said buoyancy means giving a buoyancy to the water treatment device such that when the container contains a predetermined amount of water treatment material, the container will sink to the bottom of the water containment while the container will float to the surface of the water when it does not contain any water treatment material or only a small amount of such water treatment material, and
   d. a projection on the center portion of the base extending below the level of the support means so that the water treatment device may rock slightly on movement of water therearound, the support means limiting the amount of such rocking movement.

8. A device as claimed in claim 7 in which said container comprises a base and sides, in which the end of said container remote from said base is closed by a closure device and in which said closure device includes said buoyancy means.

9. A device as claimed in claim 7 in which said support means comprises a plurality of legs that are separated from one another by openings through which water can flow under said base.

10. A device as claimed in claim 7 in which the support means comprises three legs.

11. A water treatment device comprising:
 a. a container having a base and sides,
 b. buoyancy means giving a buoyancy to the water treatment device such that when the container contains a predetermined amount of water treatment material, the container will sink to the bottom of the water containment while the container will float on the surface of the water when it does not contain any water treatment material or only a small amount of such water treatment material,
 c. support means located at the periphery of the base to support the container off the bottom of the water containment, said support means having openings therethrough to permit the flow of water below the base of the container, and
 d. a projection centrally located within the support means and extending below the base to a greater extent than the support means so that the container may rock slightly on movement of the water therearound, said support means limiting the amount of such rocking movement.

12. A water treatment device for treating water in a water containment comprising
 a. a container having a base, sides and top cover,
 b. buoyancy means within the container adjacent the top cover and giving a buoyancy to the water treatment device such that when the container contains a predetermined amount of water treatment material, the container will sink to the bottom of the water containment while the container will float on the surface of the water when it does not contain any water treatment material or only a small amount of such water treatment material, and
 c. support means located at the periphery of the container to support the base of the container off the bottom of the water containment, said support means having openings therethrough extending a portion of the height of said support means and being of sufficient size to permit flow of water between the container and the bottom of the water containment.

13. A device as claimed in claim 12 in which said support means comprises a skirt depending from the periphery of said base and has a plurality of apertures formed therein through which water can flow.

14. A device as claimed in claim 13 in which said skirt is outwardly belled to have an enlarged lower part on which the device may be supported.

15. A device as claimed in claim 13 in which said skirt has an axial height which is about one half the height of said container.

16. A device as claimed in claim 12 further comprising a weight located centrally of the base to ensure that the device will remain upright.

17. A device as claimed in claim 12 in which the support means is located at the periphery of said base.

18. A device as claimed in claim 17 further comprising a weight located centrally of the base to ensure that the device will remain upright.

19. A water treatment device for treating water in a water containment comprising
 a. a container having wall means forming a base, sides and top cover,
 b. openings in the wall means remote from said base,
 c. nodules formed on the container surrounding said openings, at least one of the nodules being removable to leave said opening to permit water flow into and out of the container,
 d. buoyancy means within the container adjacent the top cover and giving a buoyancy to the water treatment device such that when the container contains a predetermined amount of water treatment material, the container will sink to the bottom of the water containment while the container will float on the surface of the water when it does not contain any water treatment material or only a small amount of such water treatment material, and
 e. support means located at the periphery of the container to support the base of the container off the bottom of the water containment to permit flow of water between the container and the bottom of the water containment.

20. A water treatment device as claimed in claim 19 wherein the nodules are integral with said wall means and are removable by being cut off from said wall means.

21. A water treatment device as claimed in claim 19 wherein the openings are in the top of the container.

* * * * *